3,398,155
2,6-DICHLORO-ISONICOTINAMIDE DERIVATIVES
AND A METHOD FOR THEIR PREPARATION
Bruce Wayne Horrom, Waukegan, Ill., assignor to Abbott
Laboratories, Chicago, Ill., a corporation of Illinois
No Drawing. Filed May 31, 1966, Ser. No. 553,692
9 Claims. (Cl. 260—295)

The present invention is directed to secondary isonicotinic acid amides; more particularly it is directed to 2,6-dihalo-isonicotinamides substituted at the amido nitrogen.

The present invention is particularly concerned with the preparation of compounds of the formula

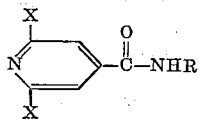

wherein each X is chlorine or bromine and R is a linear, branched or cyclic alkyl of 3–4 carbon atoms or a group of the formula $-(CY_2)_nR'$ wherein $n$ is 1 or 2, each Y is hydrogen or methyl and R' is Br, Cl, C≡CH, CN, OH or lower alkoxy. These compounds are highly effective as tranquilizers for warm-blooded animals when administered in low dosages; at somewhat higher dosages they possess valuable sedative activity; for example, oral dosages of 2.5 mg./kg. in mice, dogs or monkeys or intraperitoneal dosages of 2.5 mg./kg. in cats produce marked tranquilizing effects. When these dosages are increased two- to ten-fold, marked sedative activity can be observed in warm-blooded animals.

In a general embodiment, the new compounds of the present invention are prepared by combining a solution of 2,6-dichloroisonicotinoyl chloride in chloroform with an aqueous solution of an amine of formula $RNH_2 \cdot HZ$ wherein Z is the anion of an acid forming a stable, water-soluble salt with said amine, at a temperature below 25° C. under stirring and in the presence of an aqueous solution of 2 to 5 molar equivalents of an inorganic, aqueous base, e.g. alkali hydroxide, carbonate or bicarbonate. Stirring is continued for at least 15 minutes after completion of the addition and the newly formed amide is isolated from the organic layer in the two-phase system so obtained. Among the amine salts, the hydrochloride, sulfate, phosphate, acetate, oxalate or fumarate are most practical and suitable for the reaction. The nature of the acid forming the acid addition salt is of no consequence since said acid does not take part or interfere with the reaction.

It is important to use between 2 and 5 moles of an aqueous base: when less base is used, the reaction only produces a poor yield and when using more than 5 molar equivalents of said base, hydrolysis may occur and lower the ultimate yield of the amide. Most commonly, sodium or potassium hydroxide is used as the base. Ordinarily, equimolar amounts of the acid chloride and the amine salt are used for the reaction, although a 5–30% excess of either reactant will not substantially change the yield of the amide.

It is also possible to prepare the new amide in a single-phase system. In that embodiment, both the acid chloride and the amine are dissolved in a low-boiling, organic solvent, e.g. tetrahydrofurane, benzene, ether, chloroform, dimethylformamide or dimethylacetamide, and the solutions are then combined. In addition to the bases named above, a tertiary amine can then be used to bind the hydrochloric acid formed in the reaction. When operating in that manner, only one equivalent of the acid-binder is required. Suitable tertiary amines are triethylamine, triethanolamine, pyridine, quinoline, and similar inexpensive materials. However, when the primary amine used as the co-reactant is an inexpensive material, said primary amine may be used in two molar equivalents, thus obviating the use of a tertiary amine. When the new amide is insoluble in the reaction medium employed, it precipitates from the reaction mixture together with the hydrochloride of the tertiary amine or the hydrochloride of the excess primary amine used; the filtered solids are then triturated with water, leaving the crude new amide. When the new amide is soluble in the reaction medium employed, it can be isolated by simple filtration of the reaction mixture and removal of the solvent from the filtrate.

In order to illustrate specific embodiments of the above process and compounds, reference is made to the following examples which are not to be construed as limitations of the process.

Example 1.—N-cyclopropyl-2,6-dichloro-isonicotinamide

A solution of 9.35 g. of cyclopropylamine hydrochloride in 100 ml. of water is placed in a flask equipped with stirrer and means for external cooling. While stirring, a solution of 21.05 g. of 2,6-dichloro-isonicotinoyl chloride in 125 ml. of chloroform is added. The reaction mixture is cooled to 0–5° and stirred vigorously while a solution of 17.4 g. of potassium hydroxide in 25 ml. of water is added dropwise over a period of 15–20 minutes. The reaction mixture is stirred for another 45 minutes under cooling and the chloroform solution is subsequently washed in series with an aqueous alkali hydroxide solution, water, aqueous hydrochloric acid, and water. The chloroform layer is separated and the chloroform is evaporated to leave 21.95 g. (95% of theory) of crude N-cyclopropyl-2,6-dichloro-isonicotinamide as a colorless solid melting at 151–152° C. after recrystallization from ethanol-water.

Example 2.—N-cyclopropyl-2,6-dibromo-isonicotinamide

By following the procedure of Example 1 but replacing 2,6-dichloro-isonicotinoyl chloride with an equimolar amount of 2,6-dibromo-isonicotinoyl chloride, N-cyclopropyl-2,6-dibromo-isonicotinamide is obtained in excellent yield. After recrystallization of the compound from ethanol-water, the pure compound shows a melting point of 162–163° C.

Example 3.—N-(3-methoxypropyl)-2,6-dichloro-isonicotinamide

To a solution of 10.9 g. of 2,6-dichloro-insonicotinoyl chloride in 150 ml. of anhydrous ether cooled in an ice bath is added under stirring a solution of 9.16 g. of 3-methoxypropylamine in 50 ml. of anhydrous ether over a period of one hour. Stirring is maintained for another 15 minutes and the mixture is then washed in series with acid, water, aqueous sodium bicarbonate, and water, and dried over anhydrous magnesium sulfate. Removal of the ether leaves 15.3 g. (98.4% of theory) of the N-(3-methoxy-propyl)-2,6-dichloro-isonicotinamide. The material, crystallized from ethanol-water 1:2, is obtained as a colorless material melting at 80–81° C.

Example 4.—N-(3-hydroxypropyl)-2,6-dichloro-isonicotinamide

By following the procedure of Example 3 but using chloroform as the reaction medium and replacing the 3-methoxypropylamine used there with 3-hydroxypropylamine, N-(3-hydroxypropyl)-2,6-dichloro-isonicotinamide is formed. The chloroform is evaporated, the residue is washed with water, and the crude product so obtained is recrystallized from ethanol-water to produce the pure product melting at 92–93° C.

Example 5.—N-isopropyl-2,6-dichloro-isonicotinamide

A solution containing 5.7 g. of cyclopropylamine and 10.2 g. of triethylamine in 50 ml. of dimethylacetamide is cooled in an ice bath and stirred mechanically while a solution of 21 g. of crude 2,6-dichloro-isonicotinoyl chloride in 50 ml. of dimethylacetamide is added dropwise. Stirring is continued for 45 minutes before the mixture is diluted with water to five times the original volume. The resulting precipitate is filtered and dried. The crude N-isopropyl-2,6-dichloro-isonicotinamide is recrystallized from a mixture of 150 ml. of ethanol and 100 ml. of water to yield the pure product melting at 172–173° C.

Examples 6–17

By following the procedure of Examples 1, 3 or 5, but using different amines, the following compounds are prepared.

I claim:
1. A compound of the formula

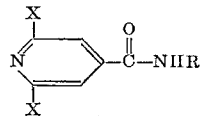

wherein each X is chlorine or bromine and R is a linear, branched or cyclic alkyl of 3–4 carbon atoms or a group of the formula —(CY$_2$)$_n$R′ wherein $n$ is 1 or 2, each Y is hydrogen or methyl and R′ is C≡CH, CN, Br, Cl, OH or lower alkoxy.

2. The compound of claim 1 wherein R is n-propyl and each X is chlorine.

3. The compound of claim 1 wherein R is cyclopropyl and each X is chlorine.

4. The compound of claim 1 wherein R is cyclobutyl and each X is chlorine.

5. The compound of claim 1 wherein R is propargyl and each X is chlorine.

6. The compound of claim 1 wherein R is isopropyl and each X is chlorine.

7. The compound of claim 1 wherein R is α,α-dimethylpropargyl and each X is chlorine.

8. The compound of claim 1 wherein R is cyclopropyl and each X is bromine.

| Ex. No. | Amine Used | Amide Obtained | Physical Data, M.P. (deg.) |
|---|---|---|---|
| 6 | NH$_2$—(CH$_2$)$_3$H | N-n-propyl-X | 94–95 (3) |
| 7 | NH$_2$—(CH$_2$)$_4$H | N-n-butyl-X | 93–94 (5) |
| 8 | NH$_2$—◁ | N-cyclobutyl-X | 118–120 (3) |
| 9 | NH$_2$—CH$_2$C≡N | N-cyanomethyl-X | 147–148 (3) |
| 10 | NH$_2$—(CH$_2$)$_2$C≡N | N-β-cyanoethyl-X | 158–159 (5) |
| 11 | NH$_2$—CH$_2$CH(CH$_3$)(C≡N) | N-β-cyanopropyl-X | 162–162.5 (5) |
| 12 | NH$_2$—C(CH$_3$)$_2$—C≡N | N-dimethylcyanomethyl-X | 178–179 (5) |
| 13 | NH$_2$CH$_2$C≡CH | N-propargyl-X | 143–144 (5) |
| 14 | NH$_2$C(CH$_3$)$_2$—C≡CH | N-α,α-dimethylpropargyl-X | 140–143 (3) |
| 15 | NH$_2$CH$_2$CH$_2$Cl | N-β-chloroethyl-X | 164–165 (1) |
| 16 | NH$_2$CH$_2$—◁ | N-cyclopropylmethyl-X | 125–126 (3) |
| 17 | NH$_2$(CH$_2$)$_3$Br | N-(3-bromopropyl)-X | 113–114 (3) |

In the above table, X is used to designate 2,6-dichloro-isonicotinamide. The parenthesized numbers at the end of each line refer to the method used as described in the examples above; in Example 7, the process of Example 5 was used with the exception that dimethylformamide was employed as the reaction medium; in Examples 10 and 11 the solvent was tetrahydrofuran; in Example 12 the acid-binding amine used was triethanolamine.

Others may practice the invention in any of the numerous ways which will be apparent to one skilled in the art by the present disclosure. All such practice of the invention is considered a part hereof provided it falls within the scope of the appended claims.

9. The compound of claim 1 wherein R is 3-hydroxypropyl and each X is chlorine.

References Cited
UNITED STATES PATENTS

| 2,647,904 | 8/1953 | Rey-Bellet | 260—295 |
| 2,776,294 | 1/1957 | Rey-Bellet et al. | 260—295 |
| 3,192,229 | 6/1965 | Biel | 260—295.5 XR |

JOHN D. RANDOLPH, *Primary Examiner.*

A. L. ROTMAN, *Assistant Examiner.*